United States Patent [19]

Epstein et al.

[11] Patent Number: 4,913,867

[45] Date of Patent: Apr. 3, 1990

[54] THERMAL PROCESS FOR STRETCH-ORIENTATION OF POLYANILINE FILMS AND FIBERS

[75] Inventors: Arthur J. Epstein, Bexley; Keith Cromack, Columbus; Mikolaj Jozefowicz, Columbus; John M. Ginder, Columbus, all of Ohio

[73] Assignee: The Ohio State University Research Foundation, Columbus, Ohio

[21] Appl. No.: 305,891

[22] Filed: Feb. 2, 1989

[51] Int. Cl.$^4$ .............................................. B29C 55/04
[52] U.S. Cl. .................................... 264/104; 252/500;
264/85; 264/171; 264/233; 264/288.4;
264/289.3; 264/290.5; 264/331.12; 264/331.19;
264/344
[58] Field of Search ................. 264/85, 104, 216, 233,
264/235.6, 235.8, 288.4, 289.3, 290.2, 290.5,
344, 171, 331.12, 331.19; 252/500

[56] References Cited

FOREIGN PATENT DOCUMENTS 62-176008  8/1987  Japan .................................... 264/104

OTHER PUBLICATIONS

M. Angelopoulos, A. Ray, A. G. MacDiarmid and A. J. Epstein, *Synth. Met.* 21 21 (1897), (Proc. Vadstena Conf., Aug. 1986).

M. Angelopoulos, G. E. Asturias, S. P. Ermer, A. Ray, E. M. Scherr, A. G. MacDiarmid, M. Akhtar, Z. Kiss and A. J. Epstein, *Mol. Cryst., Liq. Cryst.*, 160, 151 (1988).

B. Wessling, H. Volk, *Mol. Cryst., Liq. Cryst.*, 160, 205 (1988).

W. Fosong, T. Jinsong, W. Lixiang, Z. Hongfang, and M. Zhishen, *Mol. Cryst., Liq. Cryst.*, 160, 175 (1988).

*Primary Examiner*—Jeffery Thurlow
*Assistant Examiner*—Leo B. Tentoni
*Attorney, Agent, or Firm*—Emch, Schaffer, Schaub & Porcello Co.

[57] ABSTRACT

A process to produce oriented, crystalline polyaniline films using simultaneous heat treatment and stressing of polyaniline films. Films stressed while being held at elevated temperatures ($T \geq 110°$ C.), showed anisotropic x-ray, IR and visible optical response.

31 Claims, 4 Drawing Sheets

EB REFLECTANCE STRETCHED FILM

— NORMAL
-- PARALLEL

THERMAL PROCESS FOR STRETCH-ORIENTATION OF POLYANILINE FILMS AND FIBERS

BACKGROUND OF THE INVENTION

The present invention relates to a novel process for the stretch orientation of polyaniline films and fibers. Films of the conducting polymer polyaniline are made by a variety of inexpensive and simple techniques, including electrochemical polymerization and solution casting. The polyaniline films made from these techniques suffer from a deficiency common to most conducting polymers: they possess little or no macroscopic orientation. Although these polymers are microscopically composed of linear chains of atoms, these chains are usually not well-oriented macroscopically. Sometimes oriented bundles of chains or fibrils are present but they are usually positioned randomly with respect to their neighboring chains. For example, in polyacetylene films some orientation can be obtained by stretching the film and causing the fibrils to line up parallel to one another. The orientation was improved when pre-stretch cis film was heated under stress in a vacuum and additional elongation occurred around the temperature range of 130°-160° C., which coincides with the temperature range for the maximum cis to trans isomerization. H. Shirakawa and S. Ikeda, *Synthetic Metals* 1, 175 (1979/1980). Alternatively, several elaborate schemes to produce aligned polyacetylene chains have been demonstrated: for example, by polymerization at 10°-13° C. in a liquid crystal medium contained in a magnetic field. K. Akagi, S. Katayama, H. Shirakawa, K. Araya, A. Mukoh and T. Narahara, *Synthetic Metals* 17, 241 (1987). In even earlier efforts, poly-p-phenylene sulphide was crystallized by stretching at high (250° C.) temperatures. [B. J. Tabor, E. P. Magre and J. Bloom, Erpn. Polymer J., 7, 1127(1971)].

Accompanying this macroscopic alignment are several effects on the physical properties of polyacetylene, all of which have technological value: the electrical conductivity and the optical absorption can become anisotropic with the largest conductivity or absorption being in the direction of stretching. Anisotropy of conductivity and optical absorption and reflection leads to novel devices such as conductors which transmit light polarized perpendicular to the orientation or alignment direction while reflecting parallel polarized light. The tensile strength of polyacetylene film is also improved dramatically by such macroscopic orientation.

Attempts to treat the polyaniline class of polymers in the same manner, at room temperature, as polyacetylene polymers have met with little or no success, despite the disclosures regarding the preparation of polyaniline films in 1986. [M. Angelopoulos, A. Ray, A. G. MacDiarmid and A. J. Epstein, Synth. Met. 21, 21 (1987) (Proc. Vadstena Conf., Aug. 1986); M. Angelopoulos, G. E. Asturias, S. P. Ermer, A. Ray, E. M. Scherr, A. G. MacDiarmid, M. Akhtar, Z. Kiss and A. J. Epstein, Mol. Cryst., Liq. Cryst. 160, 151 (1988)].

The alignment of polyaniline films, such as emeraldine films, has been a topic of ongoing research. Stretching of polyaniline films at room temperature by adhering the films to stretchable polyethylene films has been attempted. [A. G. MacDiarmid, et al., Univ. of PA., to be published.] Further, spinning of a conducting form of polyaniline has been attempted and has resulted in fibers. These fibers have been spun at room temperature from solutions in concentrated sulfuric acid. Attempts to stretch these polyaniline films and fibers have been reportedly unsuccessful. A. Andreatta, Y. Cao, J. C. Chiang, A. J. Heeger, and P. Smith, *Synthetic Metals*, in press.

Therefore, a simple process for the stretch-orientation of polyaniline films and fibers to provide desired technological improvements such as anisotropic electrical conductivity, optical absorption, and tensile strength is in demand and desired.

SUMMARY OF THE INVENTION

The invention provides a novel class of techniques or processes to produce oriented polyaniline films based upon the simultaneous heat treatment and stretching or stressing of such polyaniline films. This process is readily extended to the stretching, during heat treatment, of composites and blends of polyanilines with host polymers such as polybutadiene or polyethylene. This process is also readily extendable to stretching during heat treatment of polyaniline films adhered to stretchable, heat processible substrates such as polyethylene films.

DESCRIPTION OF THE PREFERRED EMBODIMENT

The preferred embodiment of the present invention provides for the macroscopic orientation of the polyaniline class of polymers. This description of the preferred embodiment is directed toward use of the insulating form of emeraldine base, a member of the polyaniline class of polymers. This description, however, is not intended to be limiting and the processes so described are applicable to all members of the polyaniline family, as well as ring and nitrogen substituted derivatives thereof.

Free standing films of the insulating emeraldine base form of polyaniline are stretch-oriented by applying a tensile force to the films while maintaining the films at an elevated temperature of between roughly 110° C., generally, and the decomposition temperature of emeraldine base (ca 250° C.). The polymer preferentially contains a plasticizer such as NMP(N-methyl pyrrolidinone) before heat treatment. The plasticizer is removed by, for example, washing the oriented film with hydrochloric acid followed by ammonia hydroxide, leaving the orientation effects intact.

The tension necessary to orient emeraldine film is of order $10^7$ N/m$^2$ with tensions of approximately $2 \times 10^7$ N/m² being preferred. For tensions exceeding 2.6×10⁷ N/m² breakage of the film is possible. The stretch alignment is improved when the stress or tension is supplied in coordination with rapid heating to the desired elevated temperature. With slow heating, less orientation is achieved. It has been observed that materials once held at an elevated temperature are more difficult to align and the quality of the aligned film is improved if the heat treatment is carried out under a non-oxidizing atmosphere.

Alignment of the film through thermal stretch orientation leads to significantly improved charge transport. For example, an emeraldine base (insulating) film cast from N-methyl pyrrolidinone stretched while being held at a temperature in the range of 110°–140° C. provides a film thickness reduction from 13 microns to 8–9 microns with the sample narrowing substantially as well. As a result, the sample then is stretched to approximately 2½ times its original length. The sample is subsequently doped with HCl of pH=1. The doped sample has a conductivity of 26–32 S/cm. parallel to the stretch direction and 8 S/cm. perpendicular to the stretch direction. The ratio of parallel to perpendicular conductivity is approximately 3–3.7. The conductivity in the parallel direction is approximately 100 times greater than the conductivity found in unoriented polyaniline measured under the same conditions.

Figure 1:
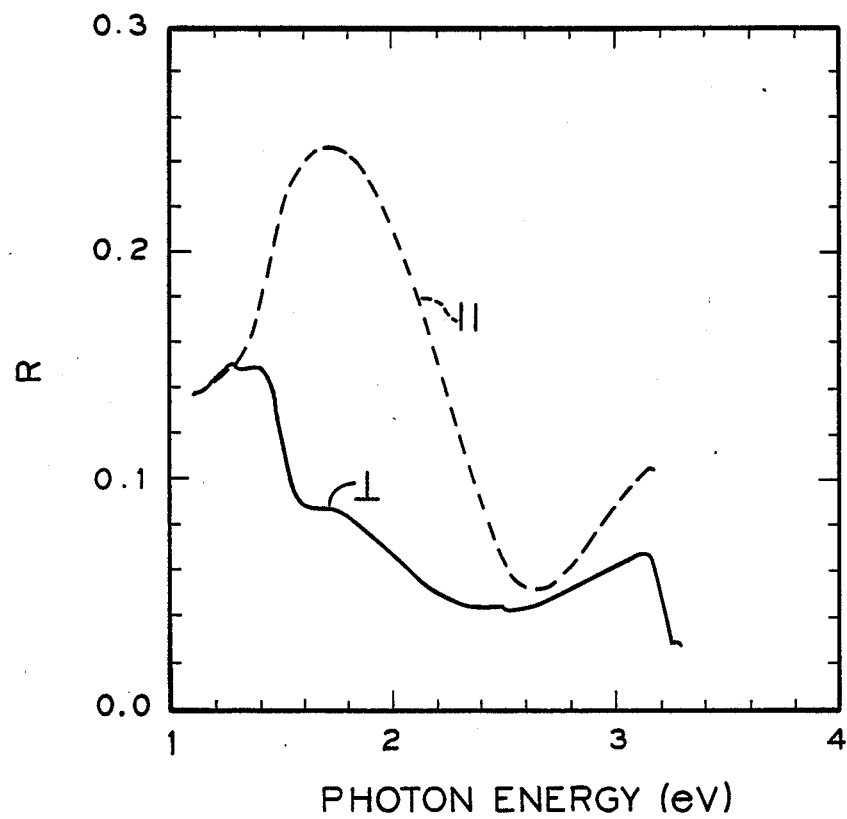
FIG. 1 shows a graph of the reflectivity spectrum of emeraldine base of polyaniline after orientation by the process of the present invention.
Figure 2:
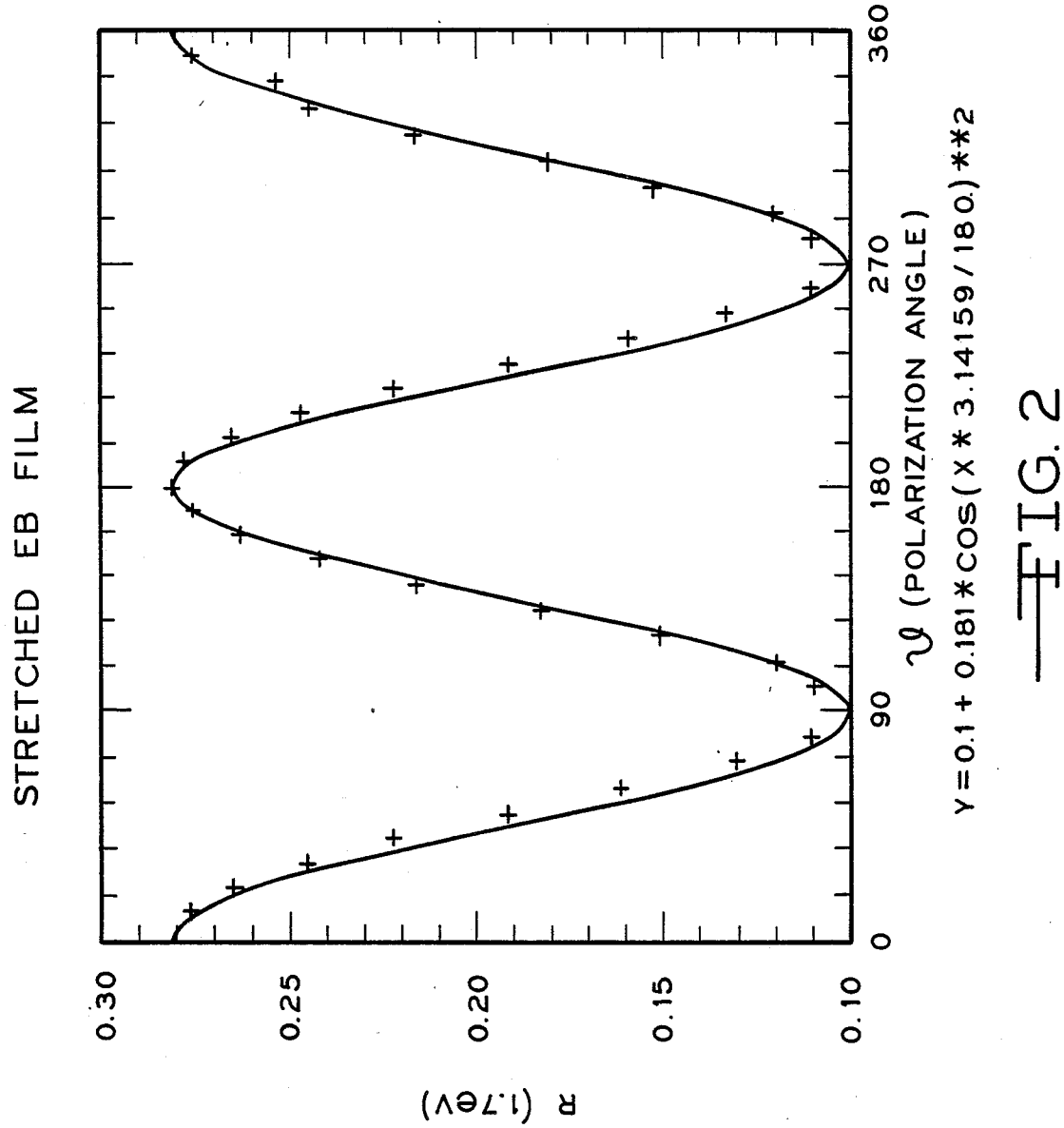
FIG. 2 shows the angular dependance of the reflectance $R(\theta)$ for the film of FIG. 1 at a fixed photon energy (1.7 eV).
Figure 3:
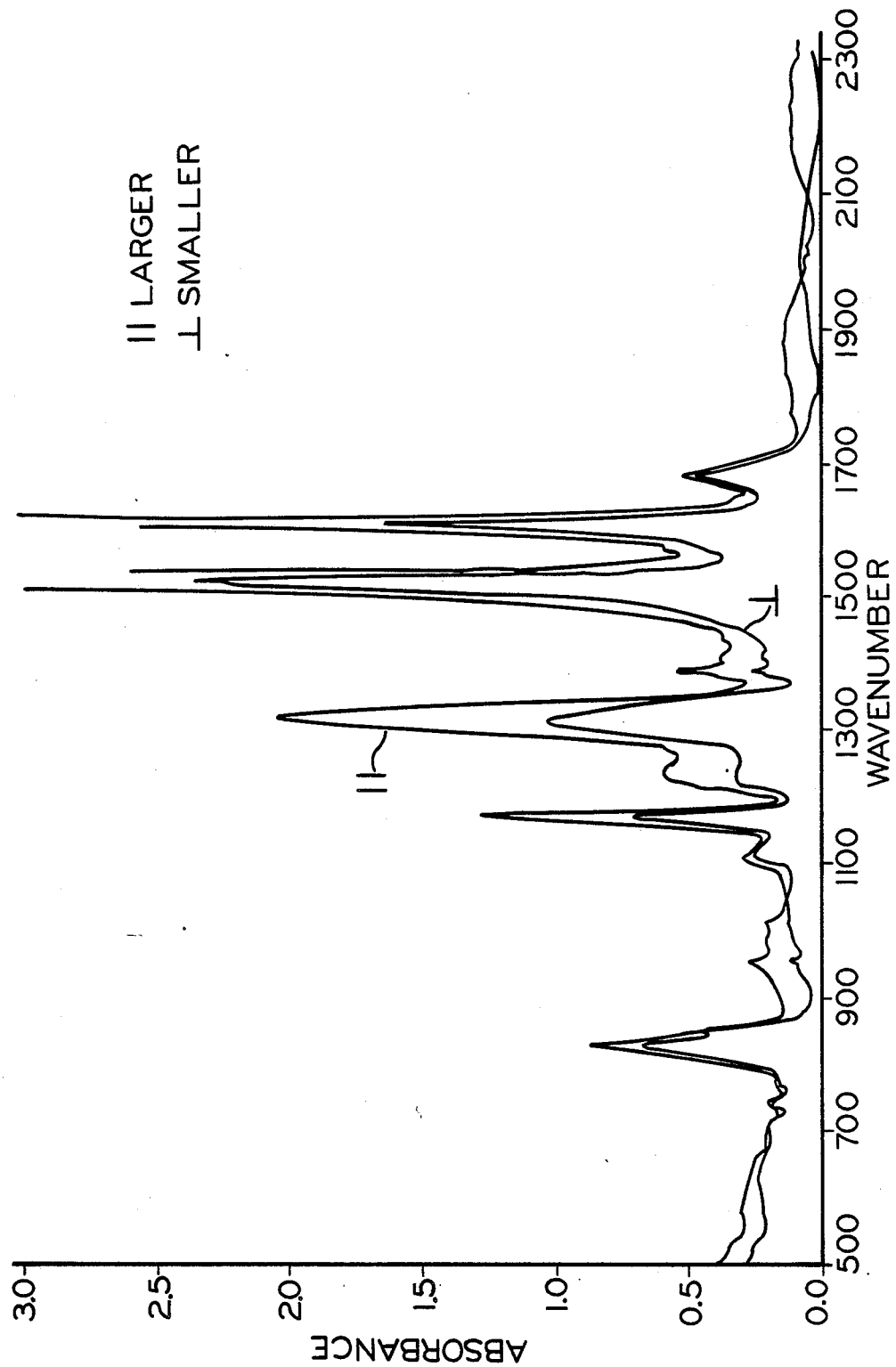
FIG. 3 is a comparative graph showing the IR absorption, in an oriented NMP polyaniline film, in a polarization parallel to the direction of orientation and a polarization perpendicular to the direction of orientation.

Optical reflectance spectra were measured on oriented emeraldine base films that were too opaque to be used for transmission measurements in the visible. The sample was held so that the stretching axis was nominally vertical. Linearly polarized light with a linear polarization angle ($\theta$) was directed toward the oriented film. The reflectivity R($\theta$) was calculated using the measured intensity of the light reflected from the sample; $\theta \leq R \leq 1$. Referring now to FIG. 1, the reflectivity spectrum with $\theta=0°$ (polarization parallel to the stretch axis) and with $\theta=90°$ (polarization normal to or perpendicular to the stretch axis) is shown. It is seen that R (0°) $\neq$ R (90°); therefore there is substantial anisotropy. Referring now to FIG. 2, the R ($\theta$), for the film which FIG. 1 has shown to be highly anisotropic, at a fixed photon energy level (1.7 eV) is shown. The solid curve represents the ideal polarizer, that is R(O)=R$\perp$+R $\parallel$ Cos² $\theta$, while the "+" are the actual data points which closely correlate with the ideal polarizer of the solid curve. FIG. 3 shows that the characteristic infrared nodes of stretched emeraldine base films are also strongly anisotropic with most of the films being more absorbing in the stretching direction. The effect of interference (causing the oscillatory behavior above 1700 wavenumbers) are used to estimate that the mid-infrared index of refraction parallel to the stretch direction is 20% larger than the index of refraction perpendicular to the stretch direction.

This process is useful in orienting other chemical forms of polyaniline, including but not limited to the leucoemeraldine base and pernigraniline base forms, as well as nitrogen and ring substituted derivatives (for example, polyorthotoluidine) of polyaniline.

Figure 4:
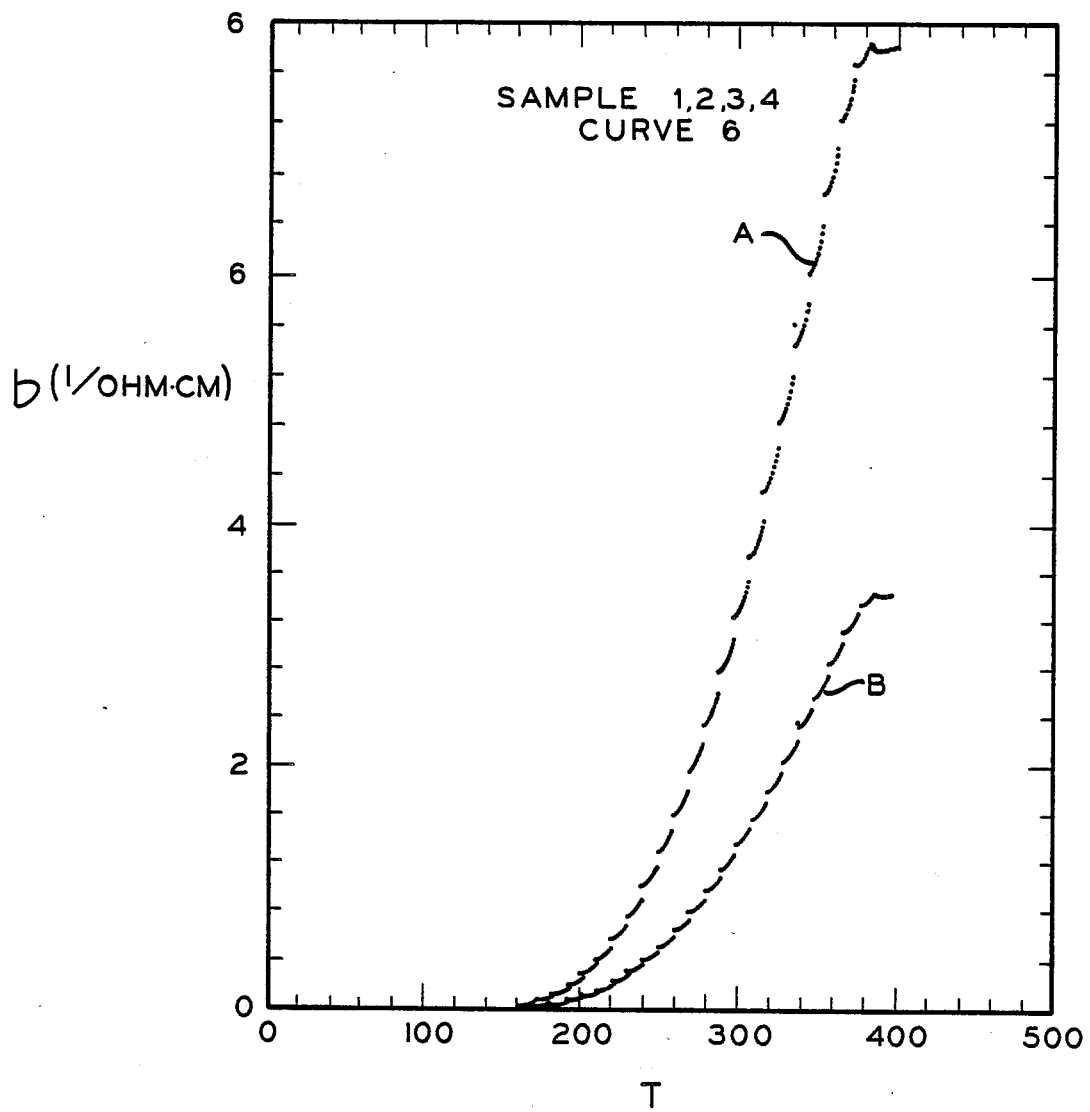
FIG. 4 shows DC conductivity curves for 40% doped polyaniline film oriented according to the process of the present invention. Top curve: conductivity parallel to stretch direction. Bottom curve: conductivity perpendicular to stretch direction.

The oriented emeraldine base films can also be converted to oriented versions of other forms of polyaniline. In particular, oriented emeraldine base films are doped by exposure to hydrochloric acid to obtain oriented films of the conducting emeraldine salt form of polyaniline. This process yields strongly anistropic optical absorptions as well as higher conductivities (FIG. 4) and increased tensile strength in a stretching direction, thereby allowing the creation of electronic, optical and mechanical components utilizing these effects. Furthermore, the success of this technique provides for thermal processing of the powdered forms of polyaniline by allowing the molding techniques in wide use in the engineering plastics industry to be applied to polyaniline.

The above description of the preferred embodiment is intended to be explanatory in nature and is not intended to be limiting upon the scope and content of the following claims.

We claim:

1. A process for producing an oriented polyaniline film comprising the steps of applying a stress to the film of an order of at least 1×10⁷ N/m² and simultaneously heating the film rapidly to an elevated temperature of between 110° C. and 250° C.

2. The process of claim 1 wherein the stress applied is approximately 2×10⁷ N/m².

3. The process of claim 1 further including the step of incorporating a plasticizer into the polyaniline film prior to heating the film.

4. The process of claim 3 wherein the plasticizer is N-methyl Pyrrolidinone.

5. The process of claim 4 including the step of removing the plasticizer by washing the film with hydrochloric acid followed by ammonium hydroxide.

6. A process for achieving macroscopic orientation of the polyaniline class of polymers comprising the steps of: applying a tensile force of between 1×10⁷ N/m² and 2.6×10⁷ N/m² to a specimen composed of the polyaniline class of polymers; and heating the specimen to an elevated temperature of between 110° C. and 250° C.

7. The process of claim 6 further including the step of applying a plasticizer of the N-methyl pyrrolidinone class to the specimen prior to said heating of the specimen.

8. The process of claim 7 further including the step of washing the specimen after orientation to remove the plasticizer.

9. The process of claim 8 wherein said washing step includes an application of hydrochloric acid followed by an application of ammonium hydroxide.

10. The process of claim 6 wherein said heating step is achieved rapidly in coordination with said tensioning step.

11. The process of claim 6 wherein said heating step is achieved simultaneously with said tensioning step.

12. The process of claim 6 wherein said heating step is achieved in a non-oxidizing atmosphere.

13. The process of claim 6 wherein the specimen is a film composed of the polyaniline class of polymers.

14. The process of claim 6 wherein the specimen is a fiber composed of the polyaniline class of polymers.

15. The process of claim 6 wherein the specimen is a composite which is partially inclusive of fibers composed of the polyaniline class of polymers.

16. The process of claim 6 wherein the specimen is a composite which is partially inclusive of film composed of the polyaniline class of polymers.

17. The process of claim 6 wherein such specimen is a composite of polyaniline and polybutadiene.

18. The process of claim 6 wherein such specimen is a composite of polyaniline and polyethylene.

19. A process for achieving macroscopic orientation of the polyorthotoluidine derivative of polyaniline, comprising the steps of: applying a tensile force of between 1×10⁷ N/m² and 2.6×10⁷ N/m² to a specimen composed of the polymer; and heating such specimen to an elevated temperature of between 110° C. and 250° C.

20. The process of claim 19 further including the step of applying a plasticizer of the N-methyl pyrrolidinone class to the specimen prior to said heating of the specimen.

21. The process of claim 20 further including the step of washing the specimen after orientation to remove the plasticizer.

22. The process of claim 21 wherein said washing step includes an application of hydrochloric acid followed by an application of ammonium hydroxide.

23. The process of claim 19 wherein said heating step is achieved rapidly in coordination with said tensioning step.

24. The process of claim 19 wherein said heating step is achieved simultaneously with said tensioning step.

25. The process of claim 19 wherein said heating step is achieved in a non-oxidizing atmosphere.

26. The process of claim 19 wherein the specimen is a film composed of the polyorthotoluidine derivative of polyaniline.

27. The process of claim 19 wherein the specimen is a fiber composed of the polyorthotoluidine derivative of polyaniline.

28. The process of claim 19 wherein the specimen is a composite which is partially inclusive of fibers composed of the polyorthotoluidine derivative of polyaniline.

29. The process of claim 19 wherein the specimen is a composite which is partially inclusive of film composed of the polyorthotoluidine derivative of polyaniline.

30. The process of claim 19 wherein the specimen is a composite of polyorthotoluidine derivative of polyaniline and polybutadiene.

31. The process of claim 19 wherein the specimen is a composite of polyorthotoluidine derivative of polyaniline and polyethylene.

* * * * *